United States Patent [19]

Stutz et al.

[11] 3,860,834

[45] Jan. 14, 1975

[54] MULTISTABLE CIRCUIT ARRANGEMENT

[75] Inventors: Theo Stutz, Bassersdorf; Albert Müller, Uster, both of Switzerland

[73] Assignee: Contraves AG, Zurich, Switzerland

[22] Filed: July 13, 1973

[21] Appl. No.: 379,193

[30] Foreign Application Priority Data

Aug. 4, 1972 Switzerland ........................ 11560/72

[52] U.S. Cl. .............. 307/289, 307/223 R, 328/205

[51] Int. Cl. ............................................ H03k 3/29

[58] Field of Search ........ 307/289, 291, 223 R, 272; 328/196, 205

[56] References Cited

UNITED STATES PATENTS

| | | | |
|---|---|---|---|
| 3,165,638 | 1/1965 | Henn et al. | 307/223 R |
| 3,593,034 | 7/1971 | Omote | 307/289 X |
| 3,746,886 | 7/1973 | Konopka | 307/223 |

*Primary Examiner*—John Zazworsky
*Attorney, Agent, or Firm*—Werner W. Kleeman

[57] ABSTRACT

A multistable circuit arrangement comprising a multiplicity *n* of at least three storage stages each of the storage stages possessing two possible operating states each of the *n* storage stages comprising amplifier stages, each amplifier stage having control inputs and at least one output, a variable coupling impedance operatively associated with each amplifier stage, wherein for each operating state of the circuit arrangement a random one of the *n* amplifier stages assumes one of both possible operating states whereas all of the other amplifier stages assume the other operating state, until upon actuating a given one of the coupling impedances of the amplifier stages operating in the other operating state the aforesaid one operating state becomes instable and only the other operating state is possible, so that only the amplifier stage associated with the actuated coupling impedance is positively controlled to assume said one operating state and to remain therein.

6 Claims, 5 Drawing Figures

MULTISTABLE CIRCUIT ARRANGEMENT

BACKGROUND OF THE INVENTION

The present invention relates to a new and improved construction of multistable circuit arrangement.

There are already known to the art, for instance under the designation ring counters, multistable circuit arrangements having a multiplicity *n* of at least three controllable storage stages each having two alternate operating states. These circuits contain for instance storage stages which are coupled with one another such that by delivering a first switching pulse the first switching stage can be controlled from a NO-state into a YES-state, by delivering a second switching pulse the second switching stage can be controlled from such NO-state into a YES-state, and by delivering a third switching pulse the third switching stage can be controlled from a NO-state into a YES-state, and so forth.

SUMMARY OF THE INVENTION

It is a primary object of the present invention to provide an improved multistable circuit arrangement comprising storage stages which can be novelly controlled so as to assume an arbitrarily chosen one of two possible operating states.

Another and more specific object of the present invention relates to a new and improved construction of multistable circuit arrangement having three or more storage stages, for example having ten storage stages, wherein, instead of delivering suitable voltage- or current pulses, it is possible through brief actuation of a respective coupling means, such as an impedance associated with each storage stage to control in a random sequence the circuit arrangement to assume each desired one of the number N of possible operating states corresponding to the number *n* of storage stages, and preferably in the manner that, for instance as is suitable with a ten-key arrangement, by briefly actuating one of the keys 0.1, 2. . .8, 9 a corresponding numerical value can be introduced into a numerical computer or calculating machine or a similar digital data processing device.

For the purpose of realizing the objects of this invention there is resorted to the use of a concept as disclosed in German patent publication No. 2,000,883, filed by the applicants of this development. In such patent as well as in the article entitled "Controlled Stability of Flip-Flop Circuit," by Theo Stutz and Albert Muller, appearing in 12-IEEE-Solid-State-Circuits-D 8758— April 1972, there is disclosed a bistable flip-flop circuit arrangement with two crosswise coupled direct-current amplifiers, where in each of both stable operating states one of the amplifiers is operated to be conductive in an active, differentially amplifying operating range and the other is operated in an inactive, non-amplifying operating range. Each of both amplifiers has associated therewith an alternating-current coupling loop with at least one variable phase-rotating impedance between its output and its input. The coupling elements or impedances together with that one of both amplifiers which is placed in its conductive active, amplifying operating state form an oscillating circuit, the oscillations of which begin as soon as a predetermined value of the variable alternating current-coupling element has been attained. Upon the start of the oscillations the amplifier previously in its active, conductive and amplifying state is automatically shifted out of this state and the other amplifier is placed into its active operating state. The flip-flop circuit arrangement remains in this newly attained operating state until there is effected a change to a different predetermined value of the alternating current-coupling impedances, which triggers resetting into the first operating state.

Basically, there is employed the recognition that a differentially amplifying amplifier becomes unstable under certain conditions in which the alternating current signals always present as disturbances at the input of an amplifier can be fed back to the amplifier input via an appropriate feedback loop or path from the amplifier output so as to be in-phase and sufficiently amplified. Further, the changes in the direct-current already brought about upon the occurrence of the self-oscillation state is sufficient to switch, via the mutual direct-current coupling path between two amplifiers, the previously non-active and non-amplifying amplifier into its active amplifying operating state and the previously active amplifying amplifier into its inactive operating state. There can be also advantageously employed a variable capacitor as the variable coupling means which can be externally actuated in order to obtain a phase-correct feedback with sufficiently amplified level at the input of an amplifier in an active amplifying operating state. As the variable capacitor there is preferably used an open capacitor, the effective capacitance of which can be increased by bringing into proximity thereto an actuation element, for instance by manually actuating a key or the like.

For the attainment of the previously discussed objectives, namely to devise a multistable circuit arrangement which for instance, through actuating a key bringing about an intended variation of a respective predetermined coupling impedance of n coupling impedances, changes from one defined situation of n possible situations of operating state directly into an arbitrarily selected new desired situation of the operating states, or possibly remains in the original operating state it was important to discover additional measures to be hereinafter defined.

Now according to the invention there is provided a multistable circuit arrangement with a multiplicity *n* of at least three storage stages each capable of assuming two possible alternate operating states, all n storage stages being constituted by amplifier stages each having control inputs and at least one output. There is further provided a respective associated variable coupling impedance which can be changed by intentional actuation thereof in a predetermined manner and wherein the components are coupled with one another such that in each operating state of the circuit arrangement a random one, but only one of the n amplifier stages is brought into a given one of both operating states, for instance the active amplifying state, whereas all of the other amplifier stages are blocked in their other operating state, for instance the inactive operating state, until upon selectively actuating an arbitrarily selected coupling impedance for the amplifier stages, with the exception of the associated amplifier stage, the given operating state is rendered instable and only the other operating state is possible, so that only the associated amplifier stage is positively controlled into the given operating state and remains therein.

According to a specific, particularly advantageous construction of the invention it is possible to have each of the $n$ amplifier stages encompass $n-1$ signal amplifiers each having a respective control input and a respective amplifier output. The outputs of the signal amplifiers of each amplifier stage are each connected via a common collector line with the input of an associated feedback amplifier. The respective output of each such feedback amplifier is directly connected, on the one hand with the similar type outputs of the feedback amplifiers of the other amplifier stages and, on the other hand, is coupled with a respective associated coupling impedance which can be intentionally externally actuated. The other terminal of each such coupling impedance is connected with predetermined inputs of all of the other amplifier stages, but not with any input of the associated amplifier stage, and wherein the arrangement is such that in each operating state of the circuit arrangement all of the signal amplifiers and the associated feedback amplifier of any given one but only one of the $n$ amplifier stages is switched into its active amplifying state, whereas the signal amplifiers of all of the other amplifier stages are switched into their inactive saturation state and the feedback amplifiers of such other amplifier stages are likewise placed into their inactive blocking state until a random coupling impedance is actuated in the sense of increasing its alternating current-transmission mass for the amplifier stages connected therewith and renders impossible the attainment of the active amplifying state, i.e., renders such instable, and thus there is automatically brought about the active amplifying state for the associated amplifier stage and such is maintained thereat.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
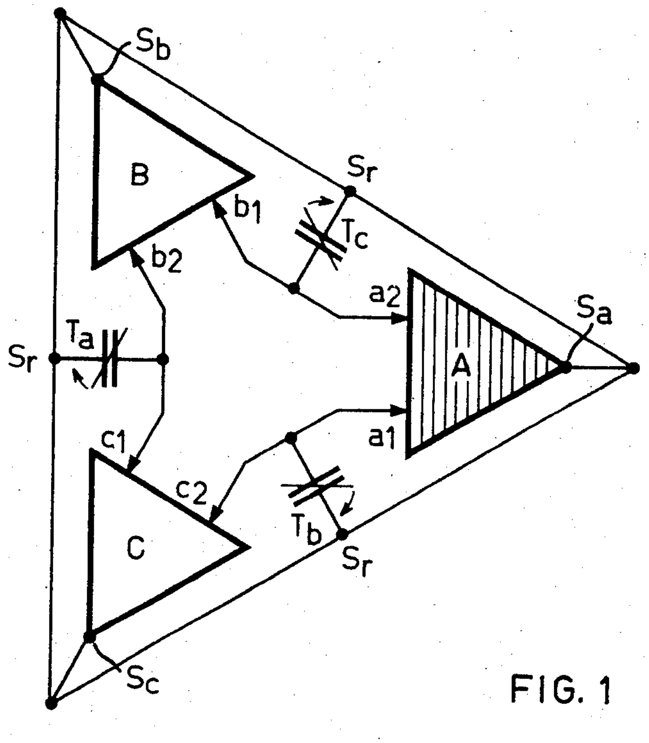
FIG. 1 is a schematic functional diagram of a tristable exemplary embodiment for explaining the desired mode of operation.

Describing now the drawings, in the functional diagram of FIG. 1 there have been shown three storage stages consisting of amplifiers A, B, C which are mutually coupled by non-illustrated direct-current paths in such a way that at any time one of the amplifiers, but only one such amplifier, for instance as shown in the drawing the amplifier A, can be driven into its active, differentially operating state, whereas both of the other amplifiers, in this instance the amplifiers B and C, are driven into their inactive, non-amplifying operating state, for instance into their saturation region or their blocking region. Furthermore, the condition of operating states momentarily attained by arrangement which is characterized by the operating state of the amplifier A assuming an active, amplifying operating state is maintained until by virtue of an intentionally brought about switching operation there is attained a change in the condition or situation of the operating states, for instance into a state where one of the other amplifiers, such as the amplifiers B or C is brought into an active amplifying operating state.

Each amplifier A, B and C has two control inputs $a_1$, $a_2$ and $b_1$, $b_2$, and $c_1$, $c_2$ respectively and a respective output $S_a$, $S_b$ and $S_c$ respectively. At the output of the amplifier which is in a momentarily active amplifying operating state, for instance at the output $S_a$ of the amplifier A there appear amplified alternating-current signals when there appears at one of the relevant inputs, for instance the input $a_1$ or $a_2$, alternating-current signals. Such appear at any time, for instance, in the form of so-called noise.

Each of the amplifiers A, B, C has operatively associated therewith a variable coupling means or impedance, here constituted by the variable coupling capacitors $T_a$, $T_b$ and $T_c$. In the non-actuated state the capacitance of such capacitors $T_a$, $T_b$, $T_c$ each possess a relatively small, practically ineffectual residual value, for instance in the order of only a few picofarads (pF). By externally mechanically actuating a given respective one of such capacitors, for instance by actuating a respective associated push button or key, even only briefly, it is possible to alter the effective capacitance of the corresponding coupling capacitor so as to assume a considerably higher working value. According to the showing of FIG. 1, the one respective connection terminals of each of the aforesaid capacitors $T_a$, $T_b$, $T_c$ are connected by means of a common lead or line $S_r$ with the outputs $S_a$, $S_b$, $S_c$ of all of the amplifiers A, B, C, whereas the other respective connection terminals of these capacitors are each connected to a respective control input of the non-associated amplifier.

Thus, the capacitor $T_a$ associated with the amplifier A is coupled with the input $c_1$ of the amplifier C and the input $b_2$ of the amplifier B, the capacitor $T_b$ with the inputs $a_1$ and $c_2$ of the amplifiers A and C, and the capacitor $T_c$ with the inputs $b_1$ and $a_2$ of the amplifiers B and C. The tristable circuit arrangement depicted in FIG. 1 functions in the following manner:

If, with the illustrated operating state or condition wherein the amplifier A is in an active operating state and the amplifiers B and C are in inactive operating states, there is increased for instance the capacitance of the capacitor $T_b$, even if only briefly, for instance by actuating an associated actuation key, so as to shift from an ineffectual residual value to a considerably higher effective value, then there is rendered effective an alternating-current feedback path from the inverting output $S_a$ of the active amplifier A via the ring conductor or common lead $S_r$ and the increased capacitance of the actuated coupling capacitor $T_b$ to the input $a_1$ of the active amplifier A, with the result that the active operating state of this amplifier A is rendered instable. In this instance, the alternating-current signals, which are always present a as disturbance at the active amplifier A, are amplified and transmitted to its output $S_a$ and via the ring conductor or common lead $S_r$ and the increased capacitance of the coupling capacitor $T_b$ they are fed back in proper phase relation i.e. in-phase, with sufficiently great amplitude to the amplifier input $a_1$ in such a manner that the active operating state of such amplifier A is rendered unstable, i.e., there is fulfilled a self-oscillating condition for such amplifier. Upon the start of an oscillation, practically already during the first half-wave, and under the influence of the direct-current coupling path the previously active amplifier A is controlled such as to assume its operating state, for instance it is shifted into its saturated state, so that as required one of both of the other amplifiers will be shifted from the previously inactive operating state into the active state. However, the amplifier C cannot shift into its active operating state because the latter is unstable as long as the actuated coupling capacitor $T_b$, which then also fulfills for the amplifier C the feedback condition via the alternating-current coupling path $S_c$-$S_r$-$T_b$-$c_2$, possesses the aforesaid increased effective capacitance.

It is for this by actuating the capacitor $T_b$ there can and must be automatically obtained only the situation or condition of operating states wherein the amplifier B is the only one in an active operating state. A corresponding actuation of the capacitor $T_c$ in the depicted condition of FIG. 1 will automatically bring about in analogous manner the operating state where the amplifier C is in its active operating state. On the other hand, actuation of the capacitor $T_a$ will not disturb the operating state for the active amplifier A in that the alternating-current signals generated at the amplifier output $S_a$ are not fed back to the inputs of such amplifier A with sufficient amplitude, via the small residual capacitance values of the capacitors $T_b$ and $T_c$ in circuit with the inputs $a_1$, $a_2$ of the amplifier A to shift amplifier A out of its active amplifying operating state, whereas alternating-current distrubance signals amplified at the amplifier A are delivered via the capacitor $T_a$, which has been adjusted to the higher effective value by actuation thereof, only to the inputs $c_1$ and $b_2$ of the inactive amplifiers B and C and thus remain ineffectual. It is here further to be mentioned that basically instead of using the capacitors $T_a$, $T_b$, $T_c$ it would be possible to employ other variable coupling means or impedances which can be mechanically actuated, such as inductances, resistances or also switching devices. Similarly it is also basically possible to devise the direct-current coupling of the amplifiers and the arrangement of the coupling means which can be actuated such that in each of $n$ possible operating states of the circuit arrangement one and only one of the $n$ amplifiers is operated in an inactive operating state and all of the other amplifiers are operated in an active amplifying operating state.

Figure 2:
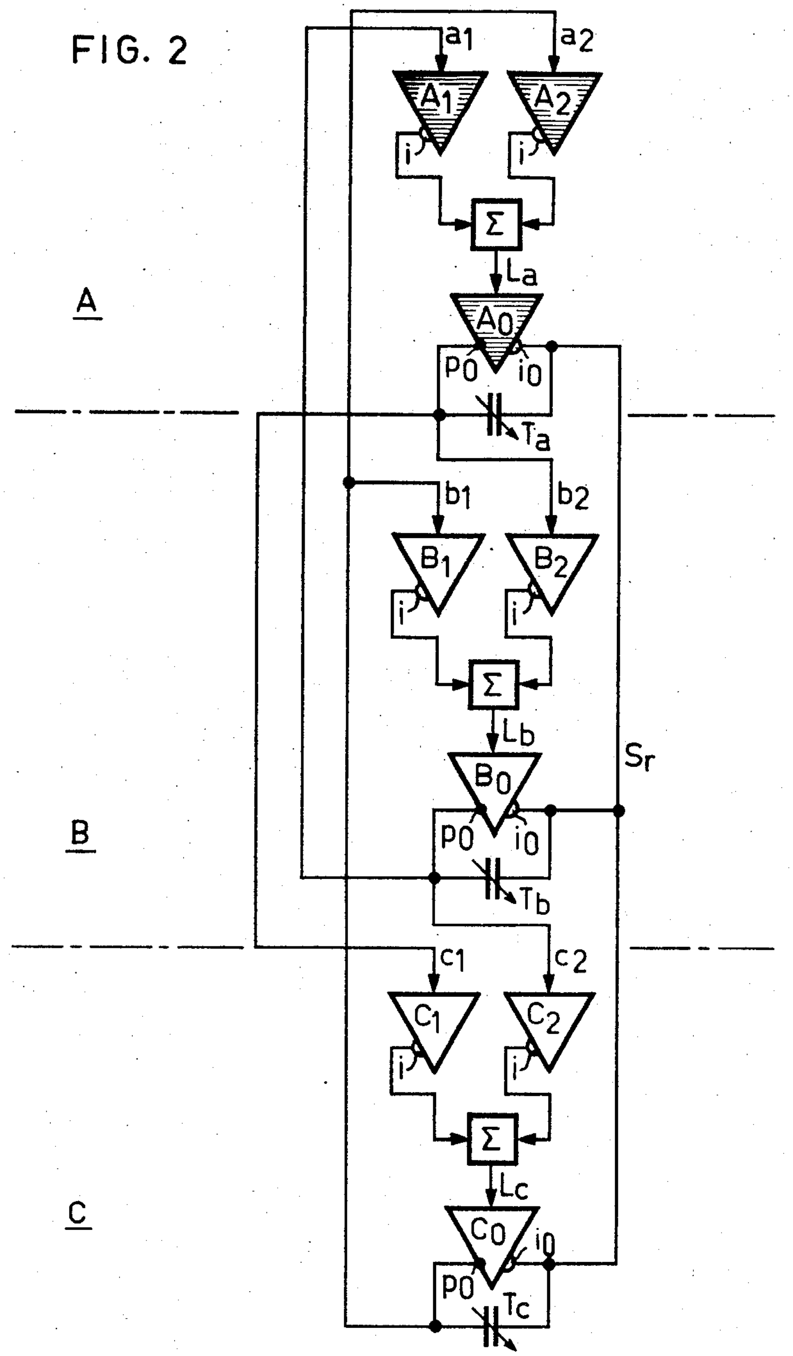
FIG. 2 is a block circuit diagram of three storage stages with associated alternating current-coupling paths for realizing the mode of operation discussed in conjunction with FIG. 1.

The block circuit diagram of FIG. 2 corresponds in its function to that of the arrangement of FIG. 1. Here there have been depicted in detail the storage i.e. amplifier stages and their connections with the coupling capacitors.

Hence, it will be seen that each storage stage A, B and C embodies two auxiliary or signal amplifiers $A_1$, $A_2$ and $b_1$, $B_2$ and $C_1$, $C_2$ respectively, each having a respective special control input $a_1$, $a_2$ and $b_1$, $b_2$, and $c_1$, $c_2$ respectively. The respective inverting output $i$ of both auxiliary amplifiers of each storage stage A, B, C are additively coupled via a respective summation element $\Sigma$ with a respective collector conductor $L_a$, $L_b$ and $L_c$ respectively. Such collector conductors $L_a$, $L_b$ and $L_c$ each lead to the input of a main amplifier $A_o$, $B_o$ and $C_o$ respectively. Each of these main amplifiers $A_o$, $B_o$ and $C_o$ possesses an inverting output $i_o$ and a non-inverting output $p_o$. The inverting outputs $i_o$ of all of the main amplifiers $A_o$, $B_o$, $C_o$ are directly connected with one another via the common lead or line $S_r$ and each such inverting output $i_o$ is connected with the associated non-inverting output $p_o$ via a respective associated coupling means illustrated as capacitor $T_a$, $T_b$ and $T_c$ respectively, as shown. The connection point of the non-inverting outputs $p_o$ of the three main amplifiers $A_o$, $B_o$, $C_o$ with the associated coupling capacitors $T_a$, $T_b$ and $T_c$ respectively, which correspond in their construction and mode of operation to the correspondingly designated components of FIG. 1, are each connected analogous to the circuit arrangement of FIG. 1 with an input of the other storage stages, as shown. Thus, the output $p_o$ of the main amplifier $A_o$ and the capacitor $T_a$ are connected with the input $b_2$ of the storage stage B and the input $c_1$ of the storage stage C, and in analogous manner the capacitors $T_b$ and $T_c$ associated with the storage stages B and c respectively, are each connected with the inputs $c_2$ and $a_1$ and $a_2$ and $b_1$ respectively, of the two other relevant storage stages C and A and A and B respectively.

By means of the shading appearing in FIG. 2 with respect to the amplifiers $A_1$, $A_2$ and $A_o$ of the storage stage A, it is intended to indicated that as in FIG. 1 there is portrayed the operating state wherein the storage stage A has its main amplifier in the active operating state while the storage stages B and C have their respective main amplifiers in the inactive operating state, which siutation for instance can be altered by actuating the capacitor $T_b$ into a condition where the stage B is active storage or by actuating the capacitor $T_c$ into the condition where the storage stage C is active, whereas any possible actuation of the capacitor $T_a$ remains ineffectual, that is to say, there is maintained the circuit state where the main amplifier of the storage stage A is in its active operating state.

Figure 3:
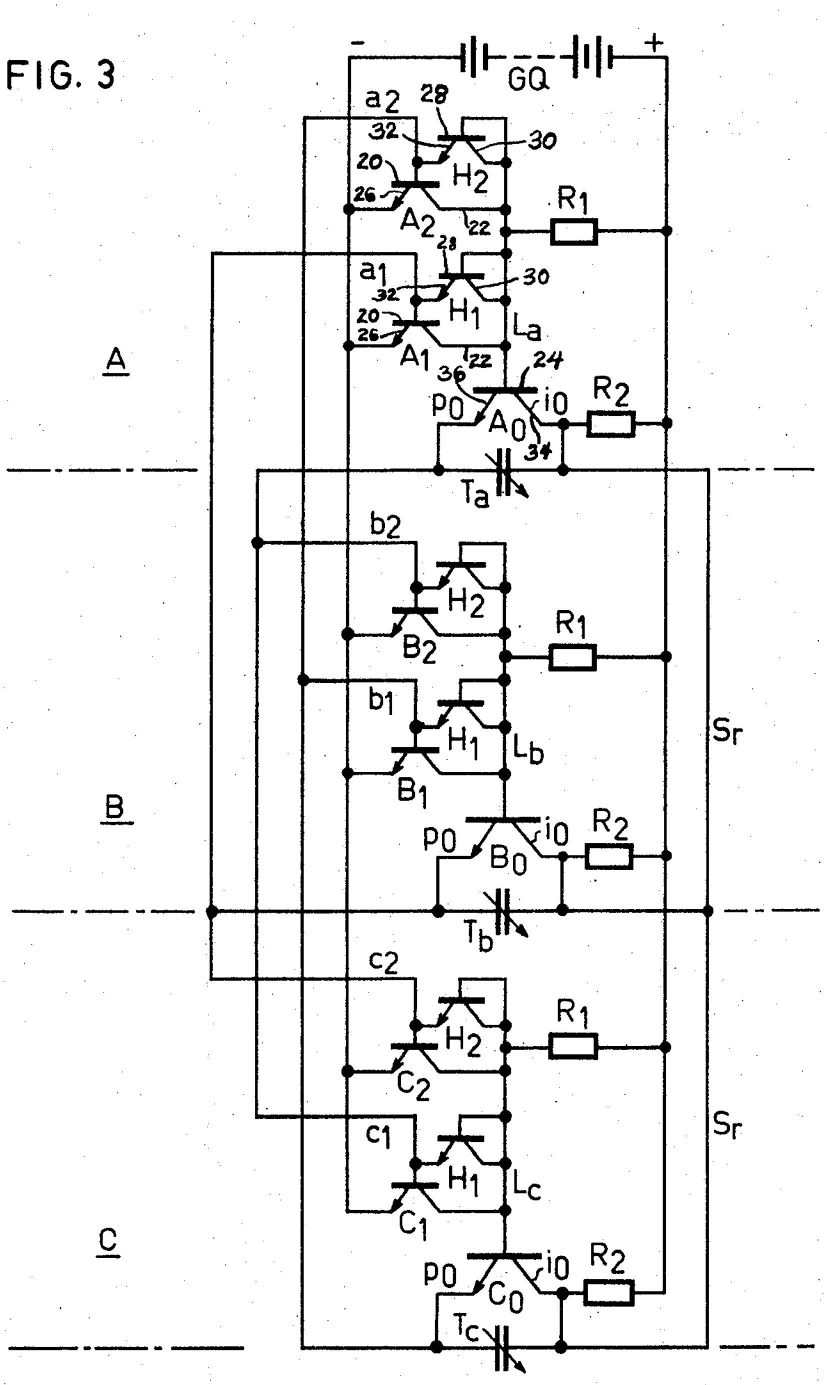
FIG. 3 is a circuit diagram of a transistorized tristable circuit arrangement of the type depicted in FIG. 2, however showing the required direct-current coupling paths and depicted as an embodiment which can be suitably constructed as an integrated circuit.

In FIG. 3 there is depicted as a preferred exemplary embodiment a complete circuit diagram of the embodiment of multistable circuit arrangement depicted in FIG. 2, wherein there has also been shown the necessary connection to the positive and negative terminals of a direct-current voltage source GQ. It will be observed that the control inputs $a_1$, $a_2$ of the storage stage A lead to the respective base electrodes 20 of both of the transistors $A_1$ and $A_2$ which are effective as respective auxiliary amplifiers $A_1$ and $A_2$. The collector electrodes 22 of the transistors $A_1$ and $A_2$ are coupled with a collector conductor $L_a$ which, in turn, is connected via a resistor $R_1$ with the positive (+) terminal of the direct-current voltage source GQ and with the base 24 of a transistor $A_o$ which has been connected and is effective as a coupling main amplifier. The emitter electrodes 26 of the transistors $A_1$ and $A_2$ are directly connected with the negative (−) terminal of the direct-current voltage source GQ. Operatively associated with each of the transistors $A_1$ and $A_2$ is a control transistor $H_1$ and $H_2$ respectively, for controlling the base potential. The base electrodes 28 and collector electrodes 30 of such control transistors $H_1$ and $H_2$ are likewise coupled with the collector conductor or line $L_a$, whereas their emitter electrodes 32 are connected with the respective base 20 of the associated auxiliary amplifiers $A_1$ and $A_2$ respectively, i.e., at their input lines $a_1$ and $a_2$ respectively. The collector electrode 34 of the main amplifier transistor $A_o$ forms the inverting output $i_o$ of the storage stage A. It is also connected via a resistor $R_2$ with the positive (+) terminal of the direct-current voltage source GQ. The emitter electrode 36 of the main amplifier transistor $A_o$ forms the non-inverting output $p_o$ of the storage stage A.

Similar to the showing of FIG. 2 here also the inverting output $i_o$ of the storage stage A is coupled with the corresponding outputs of the storage stages B and C via the conductor or common lead $S_r$ and with the associated coupling capacitor $T_a$, the other terminal of which is connected with the emitter 36 i.e., the output $p_o$ of the main amplifier transistor $A_o$ and with the input $b_2$ of the storage stage B as well as with the input $c_1$ of the storage stage C. Both of the other storage stages B and C correspond in their construction and their circuit connections completely to the described storage stage A, as will be apparent by referring to FIG. 3. It is advantageous to ensure that all of the auxiliary amplifier transistors $A_1$, $A_2$, $B_1$, $B_2$, $C_1$, $C_2$ and the control transistors $H_1$, $H_2$ of all storage stages have identcal operating characteristics and are fabricated in a single working operation upon a common base substrate. The effective surfaces of the main amplifier transistors $A_o$, $B_o$, $C_o$ should be greater than the corresponding surfaces of the other transistors.

The circuit arrangement depicted in FIG. 3, as concerns its construction and its mode of operation, corresponds to that of FIG. 2. It is assumed that according to the showing of FIG. 3 there is momentarily realized a situation or condition wherein the storage stage A is in its active operating state and the storage stages B, C are in inactive operating states and that the coupling capacitors $T_a$, $T_b$, and $T_c$ are non-actuated. Then the actively amplifying transistors $A_1$, $A_2$ receive control currents of minimum magnitude via their inputs $a_1$ and $a_2$ respectively, from their therewith connection emitter outputs $p_o$ of the main amplifier transistors $B_o$ and $C_o$ respectively. The collector-emitter currents of the transistors $A_1$ and $A_2$ then possess relatively low values which are of the same magnitude, and the potential of the collector conductor $L_a$ is relatively high. The main amplifier transistor $A_o$ of the storage stage A is then likewise driven into its active amplifying operating state and delivers from its emitter output $p_o$ to the inputs $b_2$ and $c_1$ relatively high control currents. By means of these input currents the transistors $B_2$ and $C_1$ are each driven into their saturation region with maximum collector-emitter currents. Consequently, the collector conductors $L_b$ and $L_c$ possess minimum potential. This again causes the main amplifiers transistors $B_o$ and $C_o$ to operate in their blocking region, with minimum emitter currents at the inputs $a_1$ and $a_2$ of the amplifier stage A. The inputs $b_1$ and $c_2$ of the transistors $B_1$ and $C_2$ respectively, receive from the outputs $p_o$ of the main amplifier transistors $C_o$ and $B_o$ respectively, just as the inputs $a_1$ and $a_2$, minimum control currents. Under the additional action of the minimum potential of the collector conductors $L_b$ and $L_c$ these transistors $B_1$ and $C_2$, as concerns the alternating currents, are practically inactive. Furthermore, since the associated coupling capacitors $B_o$ and $C_o$ are blocked the storage stages B and C are in a totally inactive operating state. The described state or condition of the circuit arrangement of FIG. 3 with active storage stage A and inactive storage stages B and C is stable and can only be shifted into its other state by actuating one of the coupling capacitors $T_b$ or $T_c$. For instance, the capacitance of the coupling capacitors $T_b$ can be brought to a considerably greater effective value by actuating the same. As a result, there becomes effectual an in-phase alternating - current feedback loop or path for the active transistor $A_1$ of the storage stage A, namely from the input $a_1$ via the inverting collector output of the transistor $A_1$ to the collector conductor $L_a$ and via the active main amplifier transistor $A_o$ to its inverting collector output $i_o$ to the conductor $S_r$ and the coupling capacitor $T_b$, the capacitance of which has been increased back to the input $a_1$ of the transistor $A_1$. Upon the occurrence or begin of a self oscillation thus brought about in the transistor $A_1$ this transistor $A_1$ is shifted or controlled to operate in its saturation range, with the result that the potential of the collector conductor drops to a minimum value and the main amplifier transistor $A_o$ becomes non-conductive. As a result, its emitter current from the output $p_o$ to the inputs $b_2$ and $c_1$ of the transistors $B_2$ and $C_1$ drops to the minimum value just as for the transistors $B_1$ and $C_2$. Consequently, each of the storage stages A, B, and C could shift temporarily to an active operating state. However, the active operating state is stable only for the storage stage B during actuation of the coupling capacitor $T_b$, because then the active amplifying state for the transistors $A_1$ and $C_2$ of the storage stages A and C respectively, coupled with the actuated capacitor $T_b$, is unstable. Hence, under the aformentioned prerequisites the stage B becomes active, with transistors $B_1$, $B_2$ and $B_o$ active and amplifying. Consequently, increased input currents are transmitted to the transistors $A_1$ and $C_2$ coupled with the emitter output $p_o$ of the storage stage B via the transistor inputs $a_1$ and $c_2$, and which input currents control such transistors so as to operate in the saturation region and indirectly the main amplifier transistors $A_o$ and $C_o$ to operate in the blocking region, while the transistors $A_2$ and $C_1$ become ineffectual. The thus positively controlled operating state of the storage stage B with the active transistors $B_1$, $B_2$ and $B_o$ brought about by the undertaken actuation of the coupling capacitor $T_b$ is thus stable, and this stable state is maintained under the influence of the relatively high input currents from the emitter output $p_o$ of the storage stage B to the inputs $a_1$ and $c_2$ of the transistors $A_1$ and $C_2$ respectively, even if the capacitor $T_b$ is no longer actuated. Only after the subsequent actuation of one of the other coupling capacitors $T_a$ or $T_c$ is it possible to again bring about an appropriate change in the state or condition of the circuit arrangement.

Figure 4:
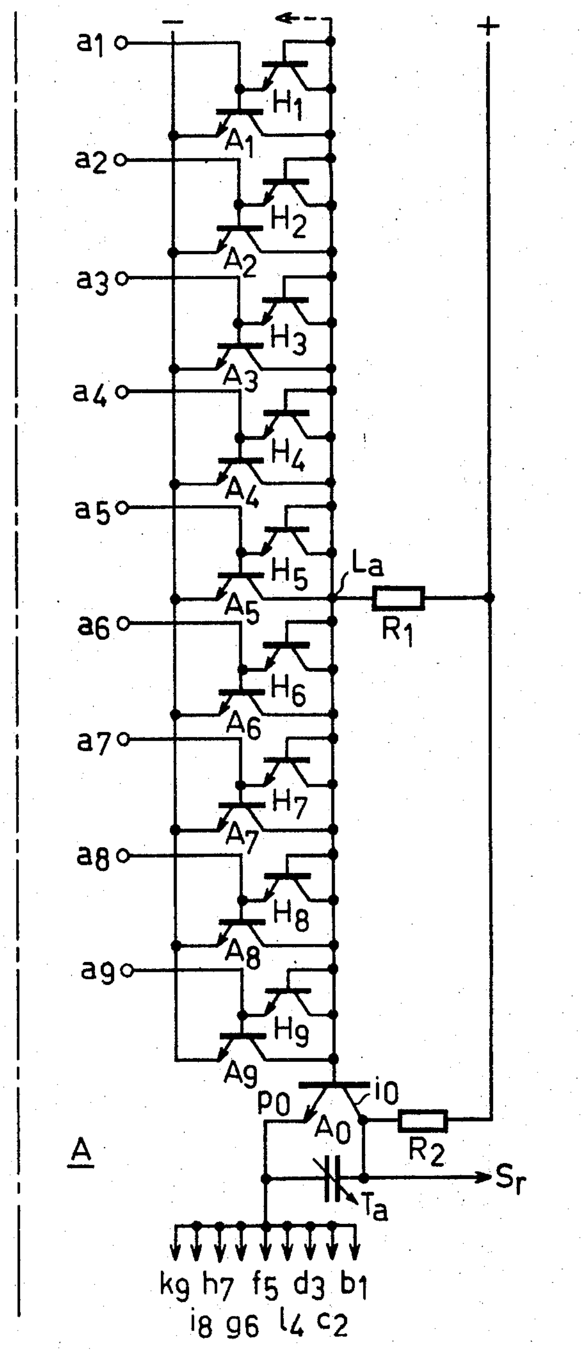
FIG. 4 is a circuit diagram, corresponding to the arrangement of FIG. 3, of a storage stage for a ten-fold stable circuit arrangement.

FIG. 4 depicts in the illustration according to FIG. 1 of the storage stage A a tenfold stable circuit arrangement, instead of only the threefold stable circuit arrangement of FIG. 1. Accordingly, each storage stage A, B. . .K (see FIG. 5), instead of having a total of three amplifiers each with two inputs, has a total of ten amplifiers A, B...K each with nine inputs, for instance $a_1$, $a_2$... $a_9$, but likewise each has only one main amplifier $A_o$, $B_o$...$K_o$. Each of these main amplifiers possess a respective inverting output $i_o$, and a respective non-inverting output $p_o$. Each of the main amplifiers has associated therewith a coupling capacitor $T_a$, $T_b$, and so forth.

Figure 5:
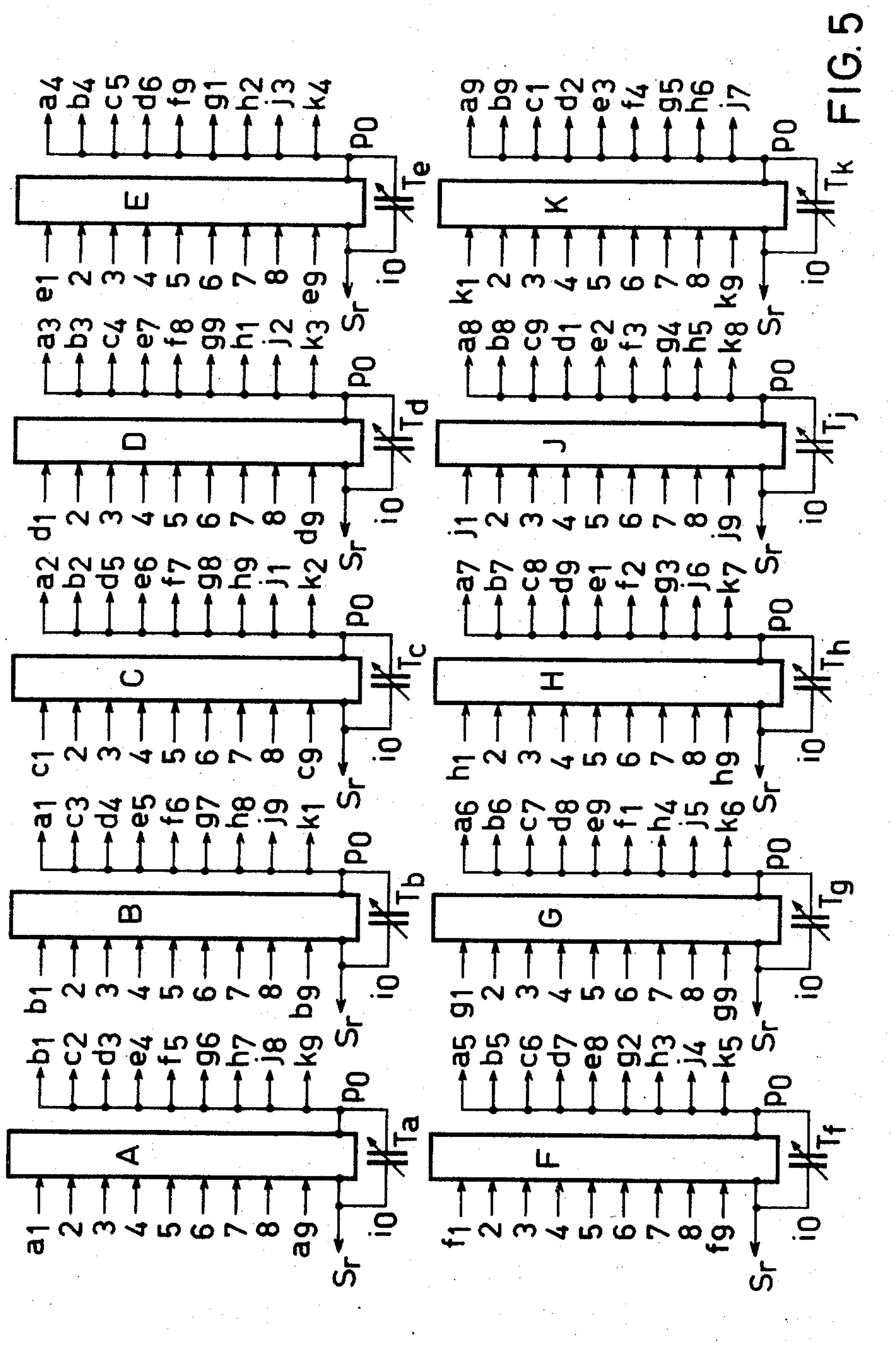
FIG. 5 is a circuit diagram of a decadic-stable circuit arrangement having ten storage stages according to the arrangement of FIG. 4.

Hence, with the circuit arrangement of FIG. 5 it is possible to automatically and positively bring about, for instance by briefly actuating the capacitor $T_b$ the operating state where the storage stage B is in its active operating state and by actuating the capacitor $T_k$ the operating state where the amplifier stage K is in its active operating state, as should be readily understood from what has been discussed above.

The circuit arrangements of FIGS. 3, 4 and 5 can be readily fabricated as monolithic intergrated circuits and, for instance, employed an numerical input arrangements for computers or calculating machines.

While there is shown and described presente-preferred embodiments of the invention, it is to be distinctly understood that the invention is not limited thereto, but may be otherwise variously embodied and practiced within the scope of the following claims. Accordingly,

What is claimed is:

1. A multistable circuit arrangement comprising a multiplicity $n$ of storage stages each operatively associated with a respective coupling means in a one-to-one correspondence, the value of $n$ being equal at least to three, a common lead, each coupling means comprising an impedance element with first and second terminals thereof between which an impedance value is variable by actuation of the coupling means, each storage stage having first and second operating states and comprising a main amplifier provided with input and output terminals between which in the first operating state an amplified signal is transferred through the main amplifier and in the second operating state the signal transfer through the main amplifier is blocked, each main amplifier having one output terminal connected to the common lead, each coupling means having its first terminal connected to the common lead and its second terminal connected to an input terminal of a main amplifier in each storage stage except its own operatively associated storage stage, any given selected storage stage operating in one given operating state and the remaining storage stages operating in the other operating state.

2. A multistable circuit arrangement as defined in claim 1, wherein the impedance element of each coupling means comprises a variable capacitor.

3. A multistable circuit arrangement comprising a multiplicity $n$ of storage stages each operativnly associated with a respective coupling means in a one-to-one correspondence, the value of $n$ being equal at least to three, a common lead, each coupling means comprising an impedance element with first and second terminals thereof between which an impedance value is variable by actuation of the coupling means, each storage stage having first and second operating states and comprising (a) a main amplifier provided with an input terminal and output terminals between which in the first operating state an amplified signal is transferred through the main amplifier and in the second operating state the signal transfer through the main amplifier is blocked, the output terminals of said main amplifier comprising a first and a second output terminal, one of which is inverting and the other one is non-inverting with respect to the input terminal, (b) $n-1$ auxiliary amplifiers each having input and output terminals, and (c) an adding circuit having $n-1$ input terminals and an output terminal, each storage stage being connected in circuit such that the output terminals of the auxiliary amplifiers are each connected to a different input terminal of the adding circuit, the output terminal of which is connected to the input terminal of the main amplifier, said main amplifier having its first output terminal connected to the common lead, each coupling means having its first terminal connected to the common lead and having its second terminal connected to the second output terminal of the main amplifier of its own associated storage stage and also to the input terminal of one auxiliary amplifier in each storage stage except its own associated storage stage, each storage stage thus receiving input from all of the other storage stages at separate auxiliary amplifiers thereof, any given selected storage stage operating in one given operating state and the remaining storage stages operating in the other operating state.

4. A multistable circuit arrangement as defined in claim 3, wherein the impedance element of each coupling means comprises a variable capacitor.

5. A multistable circuit arrangement comprising a constant voltage source having first and second terminals, a multiplicity $n$ of storage stages each operatively connected with a respective coupling means in a one-to-one correspondence, the value of $n$ being equal at least to three, a common lead, each coupling means comprising an impedance element with first and second terminals between which an impedance value is variable by actuation of the coupling means, each storage stage comprising (a) a main transistor, (b) $n-1$ auxiliary transistors, (c) $n-1$ control transistors, each transistor having base, emitter and collector terminals, and (d) first and second resistors each having first and second terminals, each storage stage being connected in circuit such that the collector terminals of the auxiliary transistors and of the control transistors and the base terminals of the control transistors are all electrically connected with the base terminal of the main transistor and with the first terminal of the first resistor, the second terminal of said first resistor being connected to the second terminal of the voltage source and the collector terminal of the main transistor being connected to the common lead and to the first terminal of the second resistor, the second terminal of the second resistor being connected to the second terminal of the voltage source, the emitter terminals of the auxiliary transistors being connected together and to the first terminal of the voltage source, each coupling means having its first terminal connected to the common lead and having its second terminal connected to the emitter terminal of the main transistor of its own associated storage stage and also to the base terminal of one auxiliary transistor in each storage stage except its own associated storage stage, each storage stage thus receiving input from all of the other storage stages at separate auxiliary transistors thereof, any given selected storage stage having its main transistor operating in the amplifying range of its characteristic whereas all other storage stages have their main transistors operating in the non-amplifying blocking range of their characteristic.

6. A multistable circuit arrangement as defined in claim 5, wherein the impedance element of each coupling means comprises a variable capacitor.

* * * * *